(12) United States Patent
Goldberg et al.

(10) Patent No.: US 12,615,410 B2
(45) Date of Patent: *Apr. 28, 2026

(54) DIGITAL TV RECEPTION USING OTT BACKCHANNEL COMMUNICATION

(71) Applicant: Sony Group Corporation, Tokyo (JP)

(72) Inventors: Adam Goldberg, Fairfax, VA (US); Graham Clift, Poway, CA (US); Luke Fay, San Diego, CA (US); Fred Ansfield, San Diego, CA (US); Loren F. Pineda, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/809,677

(22) Filed: Aug. 20, 2024

(65) Prior Publication Data

US 2024/0414392 A1    Dec. 12, 2024

Related U.S. Application Data

(63) Continuation of application No. 17/935,849, filed on Sep. 27, 2022, now Pat. No. 12,108,109.

(51) Int. Cl.
*H04N 5/50*          (2006.01)
*H04N 21/41*         (2011.01)
(Continued)

(52) U.S. Cl.
CPC ......... *H04N 21/4384* (2013.01); *H04N 5/505* (2013.01); *H04N 21/4104* (2013.01); *H04N 21/4622* (2013.01)

(58) Field of Classification Search
CPC .......... H04N 21/4384; H04N 21/4104; H04N 21/4622; H04N 21/6547; H04N 21/6582; H04N 21/44209
See application file for complete search history.

(56) References Cited

U.S. PATENT DOCUMENTS 6,583,825 B1 *   6/2003   Yuen .................. H04N 21/4524
                                                              725/132
8,255,378 B2     8/2012   Ji et al.
                          (Continued)

FOREIGN PATENT DOCUMENTS

EP          2742596 B1      3/2019
KR      20070089275 A  *   8/2007    .......... H04N 21/431
WO       2016166691 A1     10/2016

*Primary Examiner* — John R Schnurr

(74) *Attorney, Agent, or Firm* — John M. Rogitz; John L. Rogitz

(57)          ABSTRACT

Techniques are described for expanding and/or improving the Advanced Television Systems Committee (ATSC) 3.0 television protocol. In an ATSC 3.0 environment, receivers (including consumer and professional receivers) have signal reception parameters and antenna factors available to them. These reception parameters, together with time and location data are transmitted to one or more servers that maintain databases of reception characteristics. This data is analyzed such that a set of likely receivable signals (based on reception parameters, date/time, location, geographical features, transmitter information, etc.) is identified. Receivers query the servers to receive information indicating the set of likely receivable signals to reduce channel scan time by scanning only or first for more-receivable channels. Also, difficult reception locations identified in the data collected by the servers are used in aggregate to guide RF improvements (e.g., adding SFN transmitters). Further, the data collected by the servers may provide data to be used to feed "MFN" data.

29 Claims, 6 Drawing Sheets

Receiver Logic

(51) Int. Cl.
 *H04N 21/438* (2011.01)
 *H04N 21/462* (2011.01)

(56) References Cited

U.S. PATENT DOCUMENTS

| 9,807,439 | B2 * | 10/2017 | Lee | H04N 21/4345 |
| 10,091,539 | B1 * | 10/2018 | Kotian | H04N 21/6543 |
| 12,108,109 | B2 * | 10/2024 | Goldberg | H04N 21/6547 |
| 2004/0128689 | A1 * | 7/2004 | Pugel | H04N 5/50 |
| | | | | 725/39 |
| 2006/0010474 | A1 | 1/2006 | Tsukamoto | |
| 2010/0169919 | A1 * | 7/2010 | Du Breuil | H04N 21/4345 |
| | | | | 725/39 |
| 2011/0013089 | A1 * | 1/2011 | Adolphson | H04N 21/4122 |
| | | | | 348/E5.093 |
| 2011/0058633 | A1 * | 3/2011 | Kim | H04H 20/26 |
| | | | | 375/344 |
| 2011/0060760 | A1 | 3/2011 | Ji et al. | |
| 2013/0141650 | A1 * | 6/2013 | Jeong | H04N 21/2665 |
| | | | | 348/732 |
| 2015/0019465 | A1 * | 1/2015 | Littlejohn | H04N 21/466 |
| | | | | 455/184.1 |
| 2015/0181282 | A1 * | 6/2015 | Majid | H04N 21/4263 |
| | | | | 725/38 |
| 2015/0222374 | A1 * | 8/2015 | Kitazato | H04N 21/4384 |
| | | | | 370/312 |
| 2015/0350721 | A1 * | 12/2015 | Fratti | H04N 21/64322 |
| | | | | 725/110 |
| 2015/0373295 | A1 * | 12/2015 | Outters | H04N 21/4367 |
| | | | | 348/552 |
| 2016/0007076 | A1 * | 1/2016 | Takaki | H04H 20/57 |
| | | | | 725/134 |
| 2016/0100213 | A1 | 4/2016 | Song et al. | |
| 2017/0251243 | A1 * | 8/2017 | Lee | H04N 21/4622 |
| 2018/0376174 | A1 * | 12/2018 | Kotian | H04N 21/6543 |
| 2020/0169685 | A1 * | 5/2020 | Clift | H04N 21/42615 |
| 2021/0185388 | A1 * | 6/2021 | Clift | H04N 21/4345 |
| 2022/0060651 | A1 * | 2/2022 | Petruzzelli | H04H 20/12 |
| 2022/0311528 | A1 * | 9/2022 | Jain | H04N 21/25841 |
| 2022/0360844 | A1 * | 11/2022 | Arana | G11B 27/10 |
| 2023/0044465 | A1 * | 2/2023 | Clift | H04N 21/4263 |

* cited by examiner

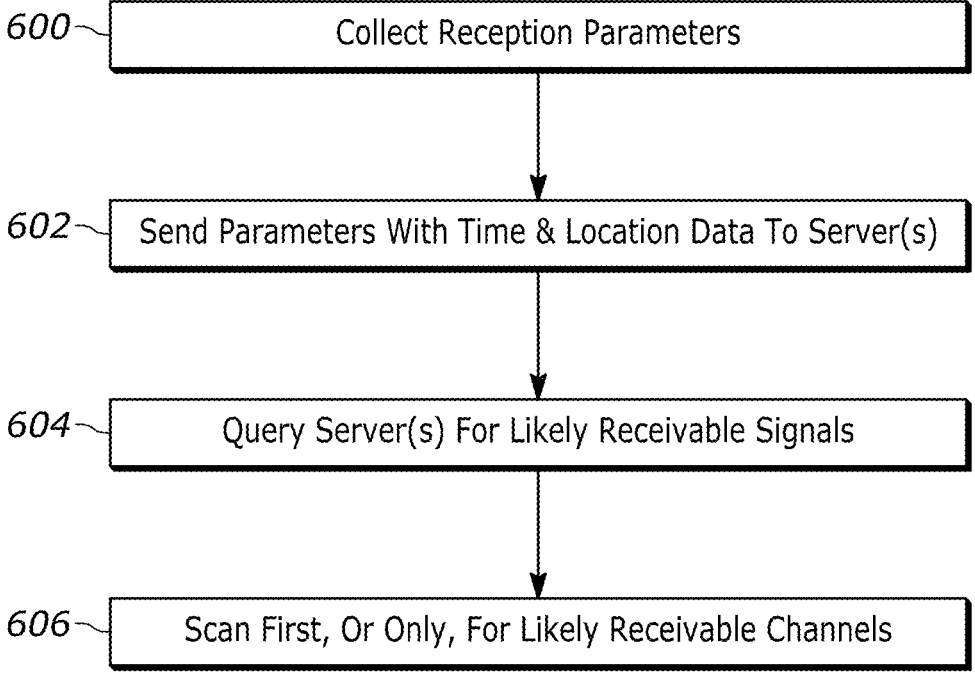
600 — Collect Reception Parameters
602 — Send Parameters With Time & Location Data To Server(s)
604 — Query Server(s) For Likely Receivable Signals
606 — Scan First, Or Only, For Likely Receivable Channels
FIG. 6 - Receiver Logic

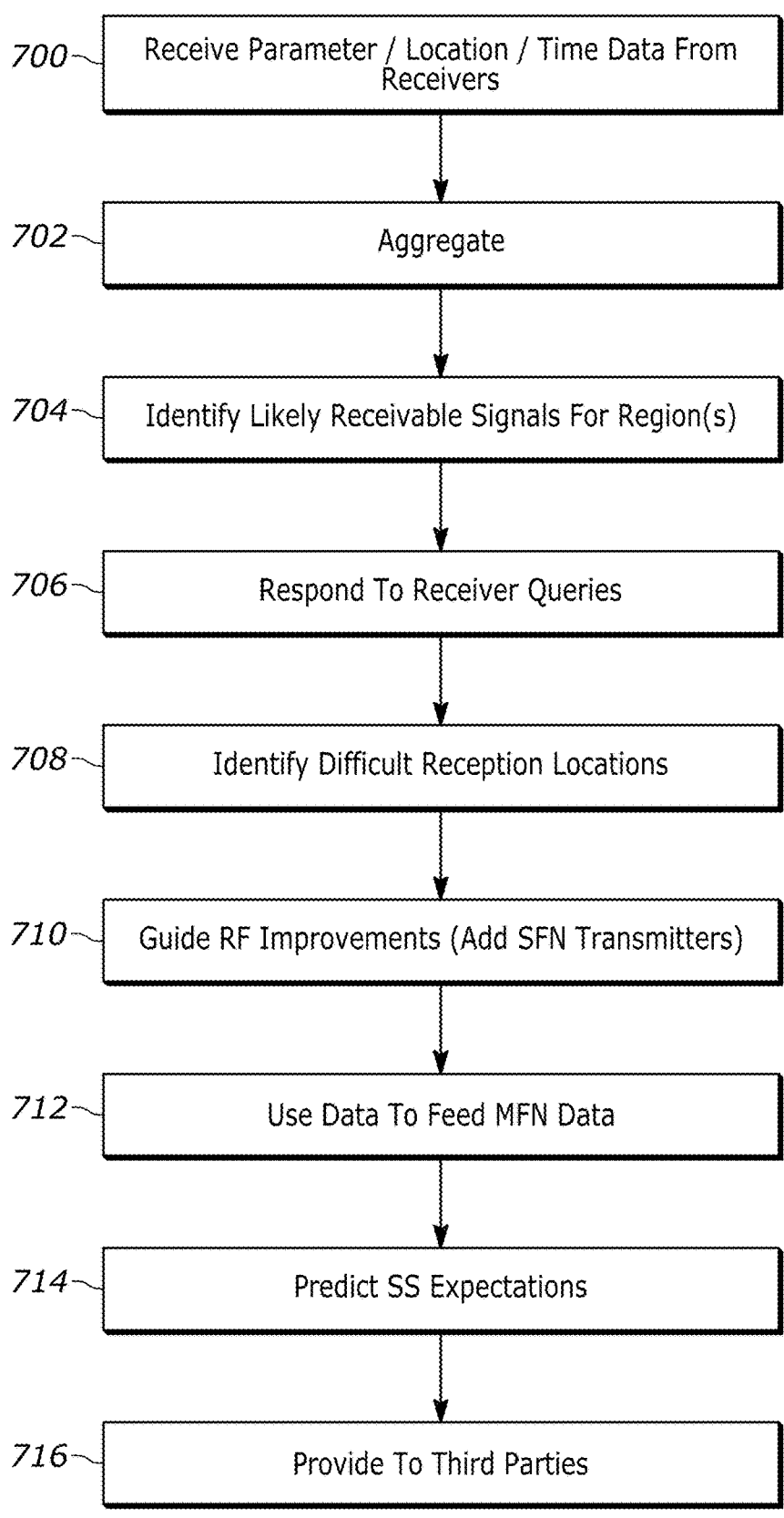
700 — Receive Parameter / Location / Time Data From Receivers
702 — Aggregate
704 — Identify Likely Receivable Signals For Region(s)
706 — Respond To Receiver Queries
708 — Identify Difficult Reception Locations
710 — Guide RF Improvements (Add SFN Transmitters)
712 — Use Data To Feed MFN Data
714 — Predict SS Expectations
716 — Provide To Third Parties
FIG. 7 - Server Logic

DIGITAL TV RECEPTION USING OTT BACKCHANNEL COMMUNICATION

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air" or OTA) and related broadband delivered content and services (referred to as "over the top" or OTT). ATSC 3.0 is designed to be flexible so that as technology evolves, advances can be readily incorporated without requiring a complete overhaul of any related technical standard.

SUMMARY

As understood herein, measurement of RF reception details, collection of those details, and acting on them has typically been a manual process with limited data points. Expanding this measurement to a large collection of consumer receivers (which report results) would add significantly to the data available.

Accordingly, in digital television in which plural receivers can receive broadcast signals from at least a first digital television broadcast assembly, a method includes receiving, from the plural receivers, respective reception parameters of broadcast channels. The method also includes identifying likely receivable channels using the reception parameters and assumptions (or user input) of antenna gains, implementation loss, etc., and sending identification of likely receivable channels to at least some of the plural receivers to enable the plural receivers to reduce channel scan time.

In some embodiments the method may include, using at least one of the receivers, scanning only for the likely receivable channels. Alternatively, the method can include, using at least one of the receivers, scanning for the likely receivable channels, and then scanning for channels other than the likely receivable channels. The method can include, using at least one of the receivers, presenting at least one of the likely receivable channels on at least one audio video display device.

In some implementations, the receivers each include an advanced television systems committee (ATSC) 3.0 receiver.

If desired, the method may include associating reception parameters and assumptions (or user input) of antenna gains, implementation loss, etc. with locations and times at which the reception parameters were collected by respective receivers, with the likely receivable channels being identified based on the reception parameters, antenna factors, locations and times. In non-limiting examples the method can include identifying difficult reception locations using the reception parameters and antenna factors, and sending identification of the difficult reception locations to at least some of the plural receivers.

In non-limiting examples the method may include providing data derived from the reception parameters and antenna factors to feed multifrequency network (MFN) data.

In some embodiments the method may include identifying the likely receivable channels at least in part using at least one machine learning (ML) model.

In another aspect, an apparatus includes at least one receiver configured to send at least one reception parameter and antenna factor related to digital television broadcast reception, along with at least one location and at least one time, to at least one wide area computer network. The instructions are executable to receive from the wide area computer network at least one indication of at least one likely receivable channel, and use the indication to scan for digital television broadcast channels.

In another aspect, a digital television apparatus includes at least one server having at least one processor programmed with instructions to configure the processor to receive, from the plural receivers, respective reception parameters and antenna factors of broadcast channels. The instructions are executable to identify likely receivable channels using the reception parameters and installed antenna factors, and send identification of likely receivable channels to at least some of the plural receivers to enable the plural receivers to reduce channel scan time.

The details of the present application, both as to its structure and operation, can best be understood in reference to the accompanying drawings, in which like reference numerals refer to like parts, and in which:

BRIEF DESCRIPTION OF THE DRAWINGS

FIG. 6 illustrates example receiver logic in example flow chart format consistent with present principles; and FIG. 7 illustrates example transmitter logic in example flow chart format consistent with present principles.

DETAILED DESCRIPTION

Figure 1:
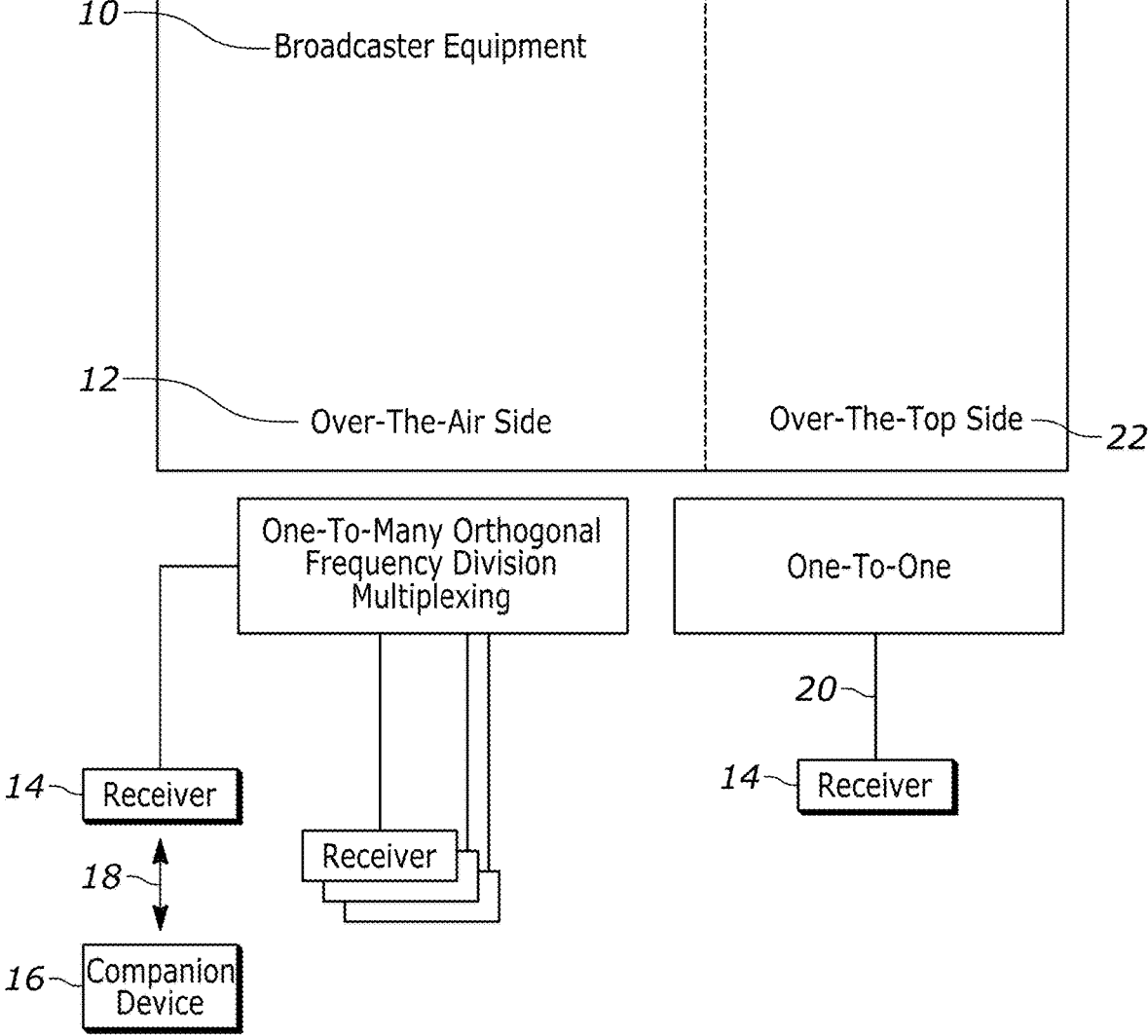
FIG. 1 illustrates an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 publication A/344, incorporated herein by reference, may be particularly relevant to techniques described herein.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable universal serial bus (USB) thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

A recitation of "having at least one of A, B, and C" (likewise "having at least one of A, B, or C" and "having at least one of A, B, C") includes alone, B alone, C alone, A and B together, A and C together, B and C together, and/or A, B, and C together, etc.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet or a content delivery network (CDN), with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
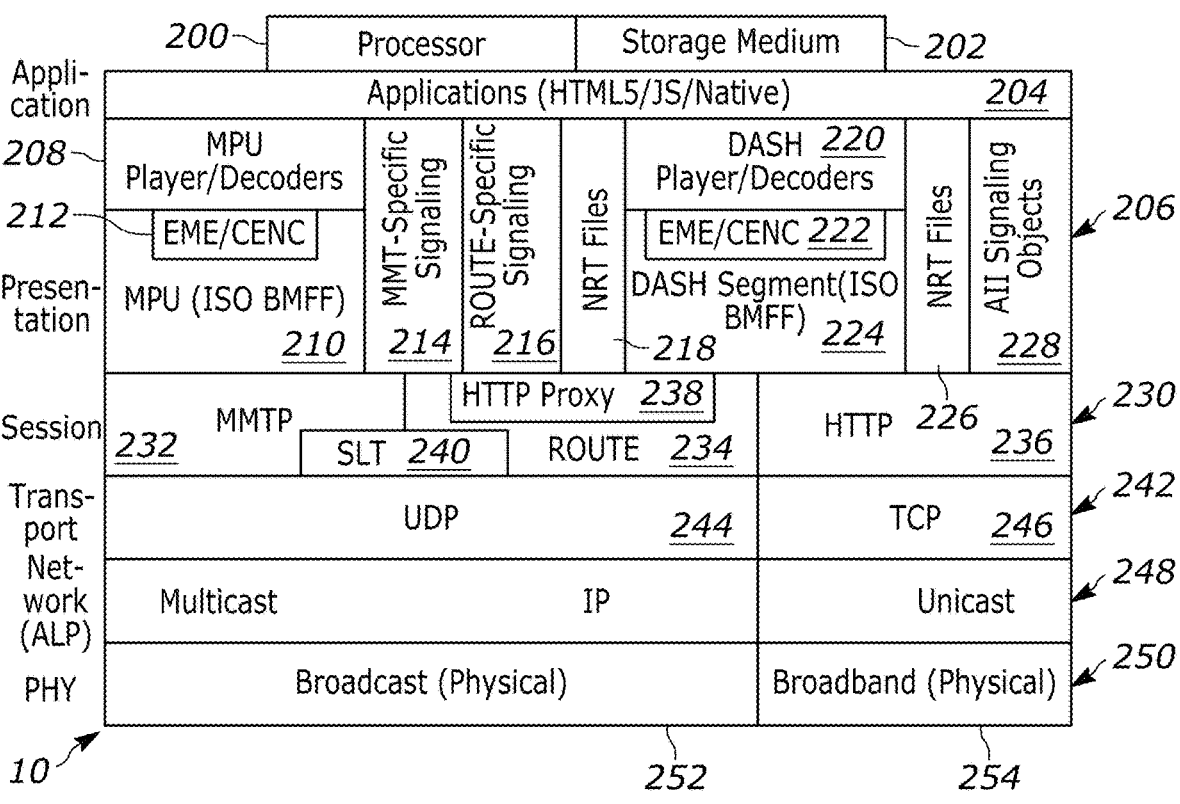
FIG. 2 illustrates components of the devices shown in FIG. 1.
Figure 2:
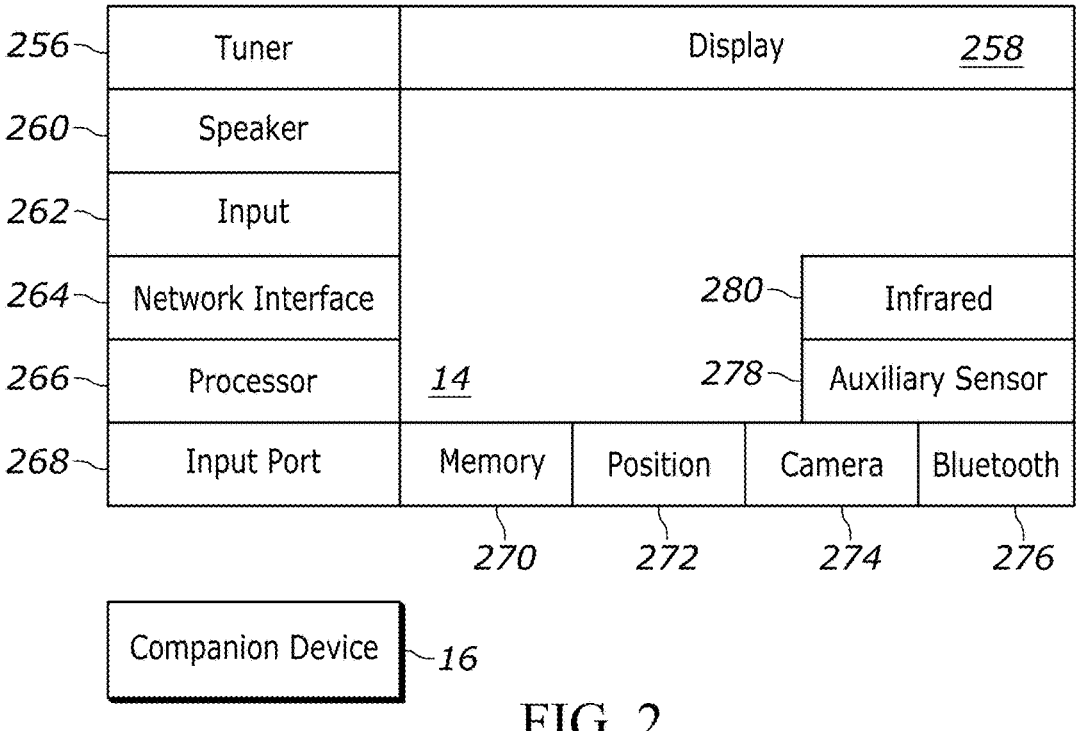

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246. The example non-limiting protocol stack shown in FIG. 2 also includes a network layer 248 below the transport layer 242. The network layer 248 uses the ATSC Link Layer Protocol (ALP) to encapsulate Internet protocol (IP) in multicast delivery, multicast delivery being typical on the broadcast side and unicast being typical on the broadband side. Below the network layer 248 is the physical layer 250 which includes broadcast transmission/receive equipment 252 and computer network interface(s) 254 for communicating on the respective physical media associated with the two sides. Note that the ATSC Link-Layer Protocol (ALP) which allows for expansion to MPEG-2, IPv6, et al.

The network layer 250 converts ATSC 3.0 Link-Layer Protocol (ALP) packets comprised of Internet Protocol (IP) packets to be suitable to be transported over the relevant medium and the physical layer may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
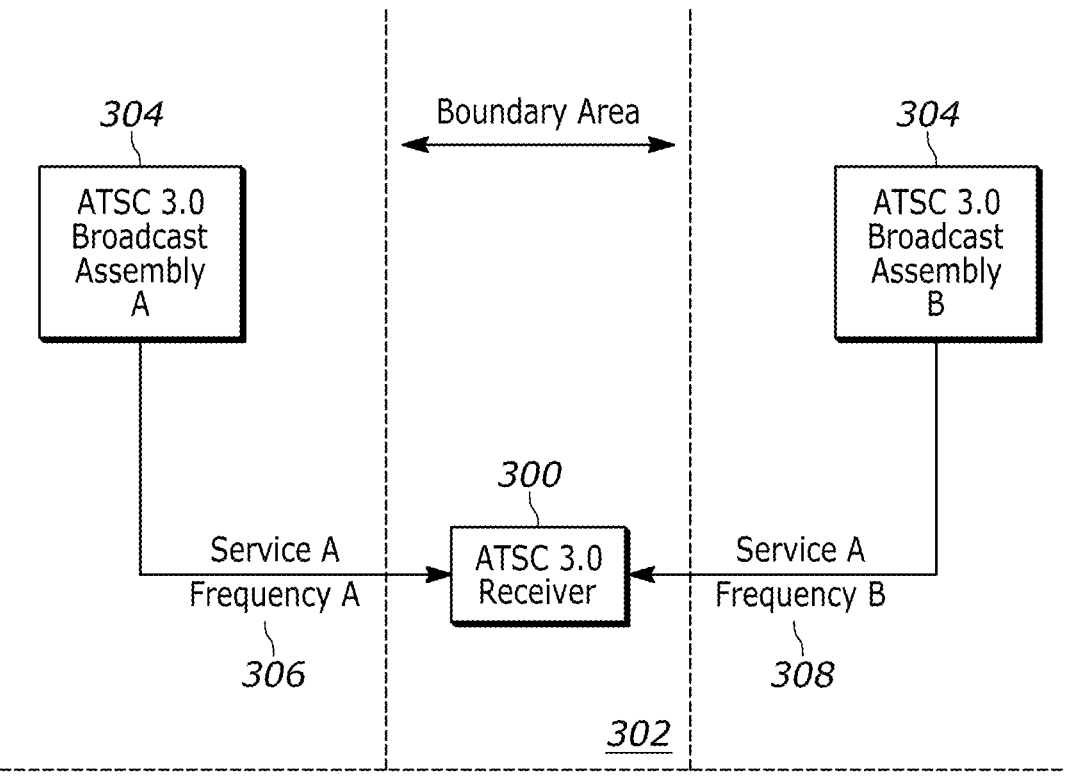
FIG. 3 illustrates an example specific system.

Now referring to FIG. 3, a simplified non-limiting example digital TV system such as an ATSC 3.0 system is shown. In FIG. 3, a mobile or stationary digital TV receiver such as an ATSC 3.0 receiver 300 that may include any or all of the relevant components discussed above in relation to FIGS. 1 and 2 is located in a boundary region 302 between first and second ATSC 3.0 broadcast stations or assemblies 304, with signals from both broadcast stations 304 being picked up by the receiver 300 in the region 302. Present principles are not, however, limited to boundary regions.

A first ATSC 3.0 service ("Service A") is broadcast from the first broadcast station 304 over a first frequency 306, whereas the same service A is broadcast from the second broadcast station 304 over a second frequency 308 different from the first frequency 306. The receiver 300 picks up both frequencies, i.e., the receiver 300 picks up signals from both broadcast stations 304.

Figure 4:
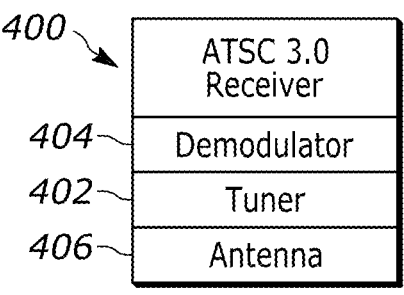
FIG. 4 illustrates a first example embodiment of a digital TV receiver.

FIG. 4 illustrates an example non-limiting embodiment of a digital TV receiver such as an ATSC 3.0 receiver 400 that may include any or all of the relevant components discussed above in relation to FIGS. 1 and 2. In the example shown, the ATSC 3.0 receiver 400 may be a stationary receiver, e.g., a receiver located inside a home. In some examples, the ATSC 3.0 receiver 400 may be a mobile receiver, e.g., as by being implemented in a mobile phone or being disposed in a moving vehicle.

The example ATSC 3.0 receiver 400 shown in FIG. 4 includes a tuner 402 sending signals to a demodulator 404 that the tuner picks up from one or more antennae 406. In the example shown, the receiver 400 includes one and only one tuner, one and only one demodulator, and one and only one antenna.

Figure 5:
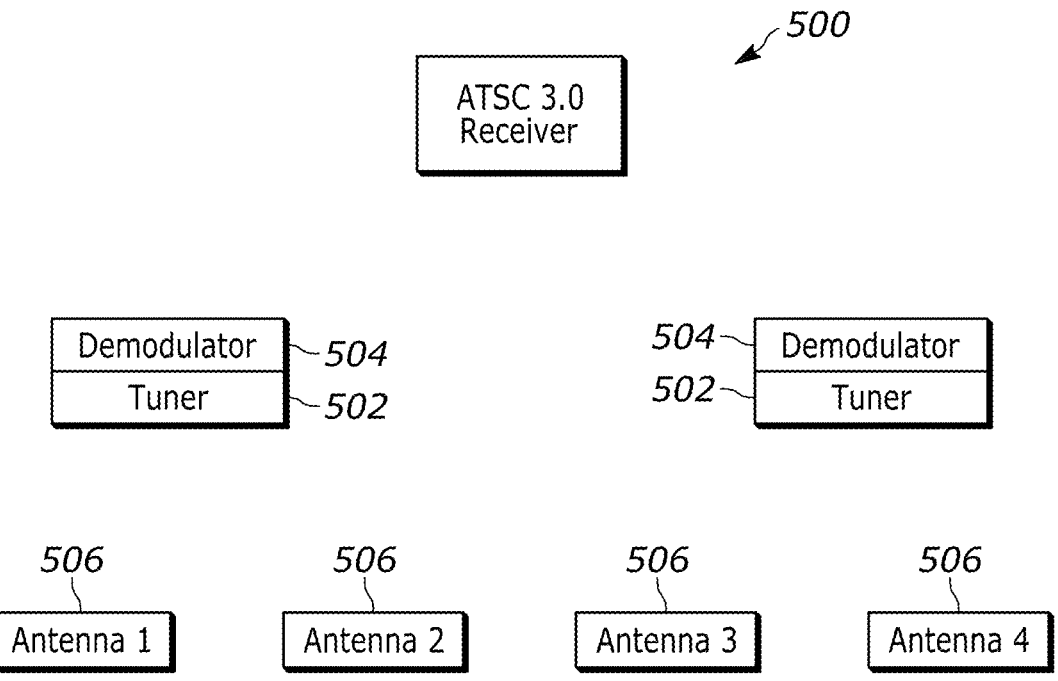
FIG. 5 illustrates a second example embodiment of a digital TV receiver.

In contrast, FIG. 5 illustrates an example non-limiting embodiment of a digital TV receiver such as an ATSC 3.0 receiver 500 that may include any or all of the relevant components discussed above in relation to FIGS. 1 and 2. In the example shown, the ATSC 3.0 receiver 500 may be a mobile receiver, e.g., as by being implemented in a mobile phone or being disposed in a moving vehicle. In some examples, the ATSC 3.0 receiver 500 may be a stationary receiver, e.g., a receiver located inside a home.

The example ATSC 3.0 receiver 500 shown in FIG. 5 includes plural tuners 502 sending signals to respective demodulators 504 picked up by the tuners from one or more antennae 506. In the non-limiting example shown, the ATSC 3.0 receiver 500 has two tuners and two demodulators, it being understood that the receiver may have a greater or lesser number of tuner/demodulators. In the non-limiting example shown, the ATSC 3.0 receiver 500 has four antennae, it being understood that the receiver may have a greater or lesser number of antennae. The receiver 500 may have the capability to switch antennae input to the tuners, such that a first tuner may receive signals from, e.g., three antennae and a second tuner may receive signals from the fourth antenna, and then a switch may be made to swap antenna input between the tuners. Two antennae may provide input to each respective tuner. All four antennae may provide input to a single tuner. These and other antenna-tuner configurations can be changed on the fly during operation as needed.

Quality metrics of RF frequencies are discussed herein, and may be identified and stored. Some quality metrics also may be referred to as reception parameters along with antenna factors. The quality metrics can include, e.g., signal to noise ratio (SNR) and error rate as may be represented by, e.g., packet error number (PEN). Antenna factors can include antenna directionality (omni, directional gain), tuning band (UHF, VHF, Low-VHF), front-to-back ratios, style (e.g., 20 mile Yagi, 60 mile Yagi), installation type (attic, outdoor 30 feet above ground elevation), average terrain level elevation, cable line loss, splitter insertion loss, etc. The quality metrics can include resolution, e.g., whether a service is in high definition (HD) or standard definition (SD). The quality metric also can include bit-rate and form-factor, recognizing that not all HD is the same. The quality metrics can include content attributes such as whether a service supports foreign languages, accessibility signaling (e.g. where signing is being done), audio description, and other content aspects. The quality metrics can include locality preference (such as a first region channel being strong, but all the ads are for the first region and not a second region preferred by the user so that a duplicate service from the second region may be accorded preference over the first region). The quality metrics can include quality of user interfaces carried in the service.

In non-limiting examples SNR may be determined during the scan by noting both the received signal strength of each received frequency and any accompanying antenna gain/noise factors on that frequency and determining the quotient thereof. Error rate may be determined by, e.g., determining a percentage of packets missed (by noting missing packet numbers) and/or by determining a percentage of received packets with errors in them as determined by error correction algorithms.

FIGS. 6 and 7 illustrate parallel receiver/server logic. In an ATSC 3.0 environment, receivers (including consumer and professional receivers) have signal reception parameters available to them. These reception parameters and antenna factors, together with time and location data of the respective collecting receivers, are collected and recorded by the receiver at block 600 and transmitted at block 602 to one or more servers, which receive the parameters at block 700 in FIG. 7. The servers maintain databases of reception characteristics and/or summaries thereof. This data in aggregate can be analyzed manually or automatically at block 702 in FIG. 7 such that a set of likely receivable signals (based on reception parameters, date/time, location, geographical features, transmitter information, etc.) is identified at block 704 in FIG. 7. Receivers query the servers at block 604 of FIG. 6 and the servers respond to queries at block 706 of FIG. 7 to send information indicating the set of likely receivable signals. At block 606 of FIG. 6 each receiver may reduce channel scan time by scanning only or first for more-receivable channels.

Also, difficult reception locations (including difficult-to-receive-channels in a particular location, if desired by time of day) are identified in the data collected by the servers at block 708 of FIG. 7. These identifications can be used in aggregate at block 710 of FIG. 7 to guide RF improvements (e.g., adding single frequency network (SFN) transmitters). These identifications also may be provided to receivers so that, for instance, channel scan for difficult-to-receive channels may be avoided when a receiver is in the accompanying location.

Further, the servers may provide collected data to be used to feed multifrequency network (MFN) data at block 712.

The above may be implemented by ATSC 3.0 receivers in the field which have return path connections to a database (internet connectivity our over-the-top via, e.g., Wi-Fi and/or 5G cellular telephony network), collecting reception data, periodically or immediately supplying data to one or more servers collecting that data.

As indicated at block 714 of FIG. 7, the aggregated reception parameter and location/time data in the server databases described above also can be used to predict signal strength expectations with assumed antenna factors, which may be sent at block 716 of FIG. 7 to third parties indicating to consumers expected service at their personal locations as provided by the third parties. An example of a third party provider is "Rabbit Ears".

A machine learning (ML) model can be applied to the aggregated reception parameter/location/time data described in FIGS. 6 and 7 to return likely receivable channels at block 706 as well as difficult reception locations at block 708. The ML model may be trained using ground truth including times, locations, and one or more reception parameters and antenna factors along with tags indicating whether parameter-location-time tuples represent likely receivable channels for the accompanying areas/times of day, difficult reception channels for the accompanying areas/times of day, or neutral with respect to likely receivable or difficult reception.

The ground truth also may include plural hypothetical receiver locations, courses, and speeds along with hypothetical reception parameters actually measured at the locations by test vehicles. The ground truth may include an indication of channel frequencies.

It will be appreciated that whilst present principals have been described with reference to some example embodiments, these are not intended to be limiting, and that various alternative arrangements may be used to implement the subject matter claimed herein.

What is claimed is:

1. A method, comprising:

receiving, from plural first digital television receivers, respective reception parameters of broadcast channels;

based on receipt of the respective reception parameters, identifying likely receivable channels; and sending identification of the likely receivable channels to a second digital television receiver to enable the second digital television receiver to reduce channel scan time;

wherein the respective reception parameters relate to error rate.

2. A method, comprising:

receiving, from plural first digital television receivers, respective reception parameters of broadcast channels;

based on receipt of the respective reception parameters, identifying likely receivable channels; and sending identification of the likely receivable channels to a second digital television receiver to enable the second digital television receiver to reduce channel scan time;

wherein the respective reception parameters relate to bit-rate.

3. A method, comprising:

receiving, from plural first digital television receivers, respective reception parameters of broadcast channels;

based on receipt of the respective reception parameters, identifying likely receivable channels; and sending identification of the likely receivable channels to a second digital television receiver to enable the second digital television receiver to reduce channel scan time;

wherein the respective reception parameters relate to form-factor.

4. A method, comprising:

receiving, from plural first digital television receivers, respective antenna factors of broadcast channels;

based on receipt of the respective antenna factors, identifying likely receivable channels; and sending identification of the likely receivable channels to a second digital television receiver to enable the second digital television receiver to reduce channel scan time;

wherein the respective antenna factors relate to front-to-back ratio.

5. A method, comprising:

receiving, from plural first digital television receivers, respective antenna factors of broadcast channels;

based on receipt of the respective antenna factors, identifying likely receivable channels; and sending identification of the likely receivable channels to a second digital television receiver to enable the second digital television receiver to reduce channel scan time;

wherein the respective antenna factors relate to style.

6. A method, comprising:

receiving, from plural first digital television receivers, respective antenna factors of broadcast channels;

based on receipt of the respective antenna factors, identifying likely receivable channels; and sending identification of the likely receivable channels to a second digital television receiver to enable the second digital television receiver to reduce channel scan time;

wherein the respective antenna factors relate to installation type.

7. A method, comprising:

receiving, from plural first digital television receivers, respective antenna factors of broadcast channels;

based on receipt of the respective antenna factors, identifying likely receivable channels; and sending identification of the likely receivable channels to a second digital television receiver to enable the second digital television receiver to reduce channel scan time;

wherein the respective antenna factors relate to average terrain level elevation.

8. A method, comprising:

receiving, from plural first digital television receivers, respective antenna factors of broadcast channels;

based on receipt of the respective antenna factors, identifying likely receivable channels; and sending identification of the likely receivable channels to a second digital television receiver to enable the second digital television receiver to reduce channel scan time;

wherein the respective antenna factors relate to cable line loss.

9. A method, comprising:

receiving, from plural first digital television receivers, respective antenna factors of broadcast channels;

based on receipt of the respective antenna factors, identifying likely receivable channels; and sending identification of the likely receivable channels to a second digital television receiver to enable the second digital television receiver to reduce channel scan time;

wherein the respective antenna factors relate to splitter insertion loss.

10. An apparatus, comprising:

at least one computer readable storage medium (CRSM) that is not a transitory signal, the at least one CRSM comprising instructions executable by one or more processors to:

transmit, to a digital television broadcast source, a location of a digital television broadcast receiver;

transmit, to the digital television broadcast source, at least one reception parameter related to digital television broadcast reception;

based on the transmissions, receive, from the digital television broadcast source, at least one indication of at least one likely receivable channel; and use the indication to scan for digital television channels;

wherein the at least one reception parameter relates to one or more of: error rate, bit-rate, form-factor.

11. The apparatus of claim 10, wherein the at least one reception parameter relates to error rate.

12. The apparatus of claim 10, wherein the at least one reception parameter relates to bit-rate.

13. The apparatus of claim 10, wherein the at least one reception parameter relates to form-factor.

14. The apparatus of claim 10, comprising the one or more processors.

15. An apparatus, comprising:

at least one computer readable storage medium (CRSM) that is not a transitory signal, the at least one CRSM comprising instructions executable by one or more processors to:

transmit, to a digital television broadcast source, a location of a digital television broadcast receiver;

transmit, to the digital television broadcast source, at least one antenna factor related to digital television broadcast reception;

based on the transmissions, receive, from the digital television broadcast source, at least one indication of at least one likely receivable channel; and use the indication to scan for digital television channels;

wherein the at least one antenna factor relates to one or more of: front-to-back ratio, cable line loss, splitter insertion loss.

16. The apparatus of claim 15, wherein the at least one antenna factor relates to front-to-back ratio.

17. The apparatus of claim 15, wherein the at least one antenna factor relates to cable line loss.

18. The apparatus of claim 15, wherein the at least one antenna factor relates to splitter insertion loss.

19. The apparatus of claim 15, comprising the one or more processors.

20. An apparatus, comprising:

at least one computer readable storage medium (CRSM) that is not a transitory signal, the at least one CRSM comprising instructions executable by one or more processors to:

receive, from plural first digital television receivers, respective reception parameters of broadcast channels;

based on receipt of the respective reception parameters, identify likely receivable channels; and send identification of the likely receivable channels to a second digital television receiver to enable the second digital television receiver to reduce channel scan time;

wherein the respective reception parameters relate to one or more of: error rate, bit-rate, form-factor.

21. The apparatus of claim 20, wherein the respective reception parameters relate to error rate.

22. The apparatus of claim 20, wherein the respective reception parameters relate to bit-rate.

23. The apparatus of claim 20, wherein the respective reception parameters relate to form-factor.

24. The apparatus of claim 20, comprising the one or more processors.

25. An apparatus, comprising:

at least one computer readable storage medium (CRSM) that is not a transitory signal, the at least one CRSM comprising instructions executable by one or more processors to:

receive, from plural first digital television receivers, respective antenna factors of broadcast channels;

based on receipt of the respective antenna factors, identify likely receivable channels; and send identification of the likely receivable channels to a second digital television receiver to enable the second digital television receiver to reduce channel scan time;

wherein the respective antenna factors relate to one or more of: front-to-back ratio, cable line loss, splitter insertion loss.

26. The apparatus of claim 25, wherein the respective antenna factors relate to front-to-back ratio.

27. The apparatus of claim 25, wherein the respective antenna factors relate to cable line loss.

28. The apparatus of claim 25, wherein the respective antenna factors relate to splitter insertion loss.

29. The apparatus of claim 25, comprising the one or more processors.

* * * * *